(No Model.)
R. ROBERTS.
WOOD CUTTING TOOL.
No. 479,306. Patented July 19, 1892.
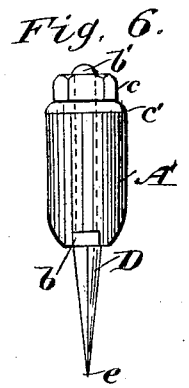
Fig. 6.
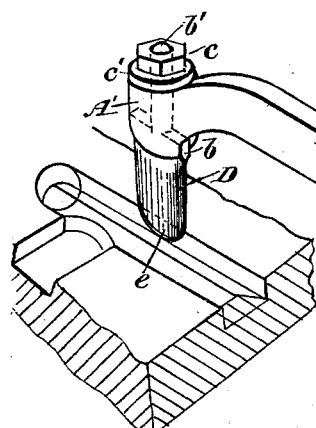
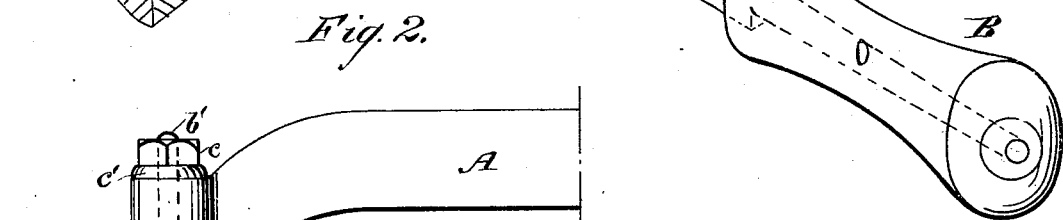
Fig. 1.
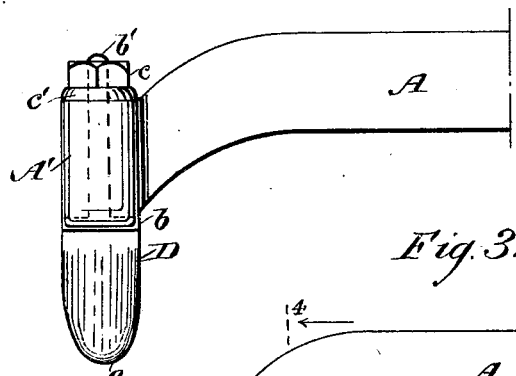
Fig. 2.
Fig. 3.
Fig. 4.
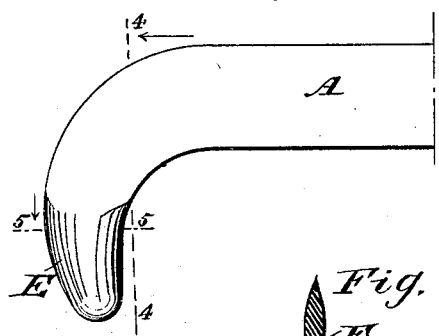
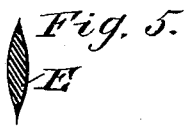
Fig. 5.
WITNESSES:
Donn Twitchell
C. Sedgwick
INVENTOR:
R. Roberts
BY Munn & Co
ATTORNEYS

UNITED STATES PATENT OFFICE.

ROBERT ROBERTS, OF BROOKLYN, NEW YORK.

WOOD-CUTTING TOOL.

SPECIFICATION forming part of Letters Patent No. 479,306, dated July 19, 1892.

Application filed October 22, 1891. Serial No. 409,478. (No model.)

*To all whom it may concern:*

Be it known that I, ROBERT ROBERTS, of Brooklyn, in the county of Kings and State of New York, have invented a new and useful Wood-Cutting Tool, of which the following is a full, clear, and exact description.

My invention is of use in the excavation of "gains" or channels in stair-stringers and for other purposes where angular grooves are to be formed in plain surfaces of wooden material, notably in wood-carving.

In stair-building the inclined side supports for the stair-steps, technically named "stringers," are provided with zigzag channels on their opposite faces throughout their length to receive and support the ends of the "tread" and "riser" boards which form the stair-steps.

It is usual in the formation of the gains or channels in stair-stringers to saw parallel kerfs in the latter of a proper depth on lines that represent the width of the channels and then remove the intervening material to the depth of the kerfs. As it is not feasible to saw a kerf partly across the face of a stair-stringer without first providing a clearance for the end of the saw-blade where the kerf terminates, such a provision has heretofore been effected by boring several holes of a depth equal to that of the channels that are to be produced, said holes being formed at the corner or angular junction of a tread-channel with a riser-channel, the material between these holes being removed with a chisel or routing-plane, so as to form short channels of the width and depth to be given to the same when completed. The described method for producing saw clearance at the angles of the zigzag channels for stairs consumes time and requires the use of several tools.

The object of my invention is to provide a simple, inexpensive, and durable tool which can be used by woodworkers generally as a routing implement for the gaining out of channels, either straight or curved, dovetailed, or otherwise in wood, and also as an intaglio-carving tool, the preferred use of the implement being to rapidly excavate the gains or zigzag channels in stair-stringers, which by a proper handling of the tool can be rapidly and perfectly effected without the use of a boring tool or saw.

To these ends my invention consists in the construction of parts and their combination, as is hereinafter described and claimed.

Reference is to be had to the accompanying drawings, forming a part of this specification, in which similar letters of reference indicate corresponding parts in all the figures.

Figure 1 is a perspective view of the cutting-tool and a portion of a stair-stringer with junctional channels partly formed, the tool being shown engaging the wood. Fig. 2 is a side view, broken, of the implement shown in Fig. 1, which is the preferred form. Fig. 3 is a side view of a modified form for the cutter of the tool, the shank being broken away. Fig. 4 is a transverse section of the cutting end of the tool shown in Fig. 3, taken on the line 4 4 in said figure. Fig. 5 is a cross-section of the blade shown in Fig. 3 on the line 5 5 in said figure, and Fig. 6 is a front end elevation of the preferred form for the tool.

There is an elongated shank A provided, terminating at one end in a handle-piece B, that is preferably made of hard wood and secured on the reduced end portion of the shank. The body of the shank A is tapered slightly from the edge that is uppermost, when the tool is in use, to the other edge, so as to hold the rest-block C on the shank without rivets, the block, which is substantially cylindrical in form, having a longitudinal groove produced in its body, wherein the shank may be driven and retain the rest-block on it at a point best adapted for effective service.

At the cutting end of the shank A, in the preferred form for the implement shown in Figs. 1 and 2, a cylindrical hub A' is integrally formed on the end portion of the shank at right angles to its edges and of a suitable length. An axial perforation is made in the hub A', and a shallow groove is formed across the lower end of the hub in the plane of the lower edge of the shank A.

The cutting-blade (shown at D in Figs. 1, 2, and 6) is made of steel and of proper thickness and width at one end $b$ to fit closely in the groove at the lower end of the hub A', a stem $b'$ of proper diameter to neatly fit the axial perforation of the hub being formed on this end of the blade D, which stem is made to project above the hub when inserted therein and is threaded to be engaged by a nut *c* and washer *c'*, the nut being screwed upon the threaded portion of the stem seats on the washer, which is located on the hub, so that the blade D may be thus firmly but removably secured to the shank A. The blade D is double convex in cross-section and tapers also longitudinally toward its lower rounded cutting-edge *e*. A two-edged blade is thus produced, which is adapted to slice wood with or across the grain when moved toward or from the operator.

To cut out a straight channel with the tool, the workman grasps the handle-piece B with his right hand or left hand, as may be most convenient, and lays the other hand on the rest-block C. The implement is then drawn along the lines that indicate the sides of the channel to be formed and the cutting-blade is embedded forcibly by pressure on the block C. Preferably there is a hole of proper diameter and depth first produced in the material operated upon at a proper point near the junction of two channels, as indicated in Fig. 1, which hole forms one terminal of the channel and facilitates the execution of the work. After the straight score is made the blade D is thrown into a laterally-inclined position and applied to the wood intervening between the side lines of the intended channel, a drawing or shoving cut while the blade is so held shear-cutting a slice from the stuff that is to be removed. The tool is similarly handled until the major portion of the channel has been cut to nearly a proper depth, as shown in Fig. 1. Then the other side edge is similarly scored perpendicularly and the remaining wood shear cut in slices toward this side of the channel, the bottom of the channel being subsequently finished with a routing-plane or chisel.

There may be several cutters D provided to enable the work to be continued by replacing a dull cutter with a sharp one, and when necessary the set of cutters may be sharpened readily.

The modified form for the cutter-blade consists of an integral hook-shaped formation produced on the end portion of the shank A, as shown in Fig. 3, said cutter E being substantially the same in form as the cutter-blade D and will be as effective in service if similarly manipulated, but is not as convenient in the matter of repair.

Having thus described my invention, what I claim as new, and desire to secure by Letters Patent, is—

1. A wood-cutting tool having a shank, a longitudinally-extending handle on one end of said shank, a rest-block on the normally-upper edge of the shank, a hub on the other downwardly-curved end of the shank, that is axially perforated to receive the stem of the cutter-blade, and a cutter-blade adapted to cut with its side edges and free end and securable in the shank-hub by its stem, and a nut on the threaded end of the said stem, substantially as described.

2. A wood-cutting tool comprising an elongated shank having a longitudinally-extending handle at one end, a rest C, extending longitudinally along the upper edge of the shank between its ends, and a downwardly-extending two-edged cutting-blade on the forward end of the shank and in the plane thereof, substantially as set forth.

3. The combination, with the shank having a hub on one end provided on its lower end with a transverse groove in the plane of the shank, of the two-edged cutting-blade D, engaging at its upper edge said groove and having a shank extending up through the hub and provided with a securing device, substantially as described.

ROBERT ROBERTS.

Witnesses:
WILLIAM A. THOMAS,
A. W. FITZGIBBON.